(12) United States Patent
Derzsi et al.

(10) Patent No.: US 12,479,379 B2
(45) Date of Patent: Nov. 25, 2025

(54) POWER SUPPLY MANAGEMENT SYSTEM FOR A VEHICLE

(71) Applicant: KNORR-BREMSE Systeme fuer Nutzfahrzeuge GmbH, Munich (DE)

(72) Inventors: Andras Derzsi, Mogyorod (HU); Peter Lindner, Rackeve (HU); David Kiss, Szar (HU)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 0 days.

(21) Appl. No.: 18/566,133

(22) PCT Filed: Jun. 29, 2022

(86) PCT No.: PCT/EP2022/067882
§ 371 (c)(1),
(2) Date: Dec. 1, 2023

(87) PCT Pub. No.: WO2023/285145
PCT Pub. Date: Jan. 19, 2023

(65) Prior Publication Data
US 2024/0246499 A1    Jul. 25, 2024

(30) Foreign Application Priority Data
Jul. 12, 2021 (EP) .................................... 21185133

(51) Int. Cl.
*B60R 16/03* (2006.01)
*H02H 7/22* (2006.01)
(Continued)

(52) U.S. Cl.
CPC .............. *B60R 16/03* (2013.01); *H02H 7/22* (2013.01); *H02J 9/002* (2013.01); *H02J 9/068* (2020.01)

(58) Field of Classification Search
CPC .. B60R 16/03; H02H 7/22; H02J 9/002; H02J 9/068; B60T 13/74
See application file for complete search history.

(56) References Cited

U.S. PATENT DOCUMENTS

| 2002/0149954 | A1 | 10/2002 | Besnier et al. |
| 2013/0234504 | A1* | 9/2013 | Morita ................ H01M 10/425 307/9.1 |

(Continued)

FOREIGN PATENT DOCUMENTS

| DE | 197 55 050 A1 | 7/1999 |
| DE | 10 2005 004 330 A1 | 8/2006 |

(Continued)

OTHER PUBLICATIONS

International Search Report (PCT/ISA/210) issued in PCT Application No. PCT/EP2022/067882 dated Oct. 19, 2022 with English translation (3 pages).

(Continued)

*Primary Examiner* — Lincoln D Donovan
*Assistant Examiner* — Alex W Lam
(74) *Attorney, Agent, or Firm* — Crowell & Moring LLP

(57) ABSTRACT

A power supply management system for a vehicle has at least one main power supply unit with at least one main power supply, at least one supplementary power supply unit with at least one supplementary power supply, at least one consumer unit, and at least one power supply line connectable to the at least one consumer unit to supply power from the at least one main power supply and/or the at least one supplementary power supply to the at least one consumer unit. The main power supply and/or the at least one supplementary power supply is/are connectable to the at least one supply line by a main power supply switch and/or supplementary power supply switch, respectively.

15 Claims, 2 Drawing Sheets

(51) Int. Cl.
*H02J 9/00* (2006.01)
*H02J 9/06* (2006.01)

(56) References Cited

U.S. PATENT DOCUMENTS

2019/0176729 A1   6/2019  Link et al.
2022/0166249 A1*  5/2022  Shindo ................. B60R 16/033

FOREIGN PATENT DOCUMENTS

WO    WO 01/79019 A1      10/2001
WO    WO 2004/042888 A1    5/2004
WO    WO 2009/145678 A1   12/2009

OTHER PUBLICATIONS

Written Opinion (PCT/ISA/237) issued in PCT Application No. PCT/EP2022/067882 dated Oct. 19, 2022 with English translation (7 pages).
Extended European Search Report issued in European Application No. 21185133.2 dated Dec. 20, 2021 (9 pages).

* cited by examiner

POWER SUPPLY MANAGEMENT SYSTEM FOR A VEHICLE

BACKGROUND AND SUMMARY

The present invention relates to a power supply management system for a vehicle.

The electrification in the automotive sector has triggered replacements of several vehicle components resulting in novel architectures. For example, many components of commercial vehicles previously relied upon compressed air as an energy source for control and actuation purposes. A redundant power supply system based on compressed air was implemented for several safety relevant components. Due to the electrification, many of these pneumatic components are to be replaced by electrically powered components. In addition, automated driving applications set new requirements for the vehicle systems and, in particular, for safety relevant consumer units.

With respect to an electric power supply, components of a respective redundant power supply system are protected against an over current or the like by a fuse. Such a fuse is, for example, arranged in a power supply line between a power supply unit and a consumer unit. In the event of an over current, blowing of the fuse disconnects the consumer unit from any further power supply. However, blowing of the fuse requires a replacement by a new fuse. Accordingly, a respective replacement is time and cost consuming. In particular, the performance of such vehicle may be limited due to the disconnection until a replacement of the fuse, even if the power supply unit returns to a normal operating state.

In view of the above, it is an object of the present invention to provide a power management system for a vehicle allowing safe power supply to a consumer unit with reduced efforts and respectively associated disadvantages in response to a failure.

The object is achieved by a power supply management system for a vehicle according the independent claims. Further aspects of the present invention are the subject of the dependent claims.

According to the present invention a power supply management system for a vehicle comprises at least one main power supply unit comprising at least one main power supply, at least one supplementary power supply unit comprising at least one supplementary power supply, at least one consumer unit and at least one power supply line connectable to the at least one consumer unit to supply power from the at least one main power supply and/or the at least one supplementary power supply to the at least one consumer unit. Further, the main power supply and/or the at least one supplementary power supply is/are connectable and disconnectable to the at least one supply line by a main power supply switch and/or supplementary power supply switch, respectively.

The at least one main power supply unit is intended to supply power to the at least one consumer unit during normal operation of the vehicle. In the event of a complete or at least partial failure of the at least one main supply unit, the at least one supplementary power supply unit is intended to at least partially replace the at least one main supply unit. Each of the at least one main power supply unit and the at least one supplementary power supply comprises at least one main power supply or at least supplementary power supply, respectively. The at least one main power supply unit and the at least one supplementary power supply may comprise further components such as a converter or the like.

As the main power supply may be connected and disconnected to the at least one power supply line by the main power supply switch, the at least one main power supply may be connected to the at least one power supply line during normal operation. In the event of a failure of the at least one main power supply or any other component of the main power supply unit, the at least one main power supply may be disconnected from the at least one supply line. This allows protection of the at least one consumer unit from any disadvantageous effect due to such failure.

Similarly, the supplementary power supply may be connected and disconnected to the at least one power supply line by the supplementary power supply switch, the at least one supplementary power supply may be disconnected to the at least one power supply line during normal operation and may be connected to the at least one power supply line on demand, e.g. in the event of a failure of the at least one main power supply or any other component of the at least one main power supply unit.

With respect to the use of the at least one main power supply switch and/or the at least one supplementary power supply switch, the at least one main power supply and/or the at least one supplementary power supply do not necessarily have to be deactivated in the event of a failure or due to non-operation for an intended power supply but may only be disconnected from the at least one power supply line. Accordingly, the at least one main power supply and/or the at least one supplementary power supply may be kept in active state, even if not connected to the at least one power supply line, to immediately provide a power supply if connected to the at least one power supply line. Furthermore, the functionality of the at least one main power supply and/or the at least one supplementary power supply may be monitored during the active state when disconnect without influencing the at least one consumer unit. In particular with respect to the at least one main power supply, the functionality or recovery after a failure may be monitored. With the at least one main power supply returning to a normal operating state, the at least one main power supply may be reconnected and the at least one supplementary power supply may be disconnected.

Accordingly, a connection of the at least one main power supply and/or the at least one supplementary power supply to the at least power supply line may be reestablished after a disconnection due to the main power supply switch and/or the supplementary power supply switch without requiring a replacement as in the event of the use of fuses.

In some embodiments, the at least one power supply line comprises at least one consumer switch configured to connect and disconnect the at least consumer unit from any power supply of the at least one main power supply and/or the at least one supplementary power supply.

The consumer switch provides a further protection of the consumer unit from any failure by the at least one main power supply and/or the at least one supplementary power supply. Assuming that the at least main power supply and the at least one supplementary power supply can be connected and disconnected from the at least one power supply line to supply power to the consumer unit by the at least one main power supply switch and/or supplementary power supply switch. In such configuration, the consumer unit can be disconnected from both, the at least one main power supply and the a least one supplementary power supply by the consumer switch independently of any switch state of the at least one main power supply switch and/or supplementary power supply switch. The consumer switch may thereby provide a further security level.

In some embodiments, the power supply management system further comprises at least one supplementary consumer unit connectable to the at least one power supply line by a supplementary consumer switch configured to connect and disconnect the at least one supplementary consumer unit to or from the at least one power supply line.

The at least one supplementary consumer unit may be a unit that may be connectable and disconnectable to the power supply on demand only. Instead, the at least one consumer unit as previously addressed may be a unit directly associated with the power supply line. Preferably, the at least one supplementary consumer unit is only connected to the power supply line, if the energy supply by the at least one main power supply and/or the at least one supplementary power supply supplies sufficient power for the at least one consumer unit and there is remaining power to be supplied to the at least one supplementary consumer unit. With the supplementary consumer unit switch disconnecting the supplementary consumer unit from the at least one power supply line, a power consumption by the at least one supplementary consumer unit with respect to a power required by the at least one consumer unit may be avoided. For example, the at least one consumer unit comprises safety relevant and safety critical functions while the at least one supplementary consumer unit does preferably not provide any safe relevant and safety critical functions. Accordingly, the at least one consumer unit is prioritized. If there is no remaining power for the at least one supplementary consumer unit, the supplementary consumer unit switch does not connect the at least one supplementary consumer unit to the at least one power supply line or disconnects the at least one supplementary consumer unit, if already connected, from the power supply line.

In some embodiments, at least one of the main power supply switch and the supplementary power supply switch is a normally open switch.

Accordingly, the main power supply switch has to be activated to connect the at least one main power supply to the at least one power supply line to supply power to the at least one consumer unit. Similarly, the supplementary power supply switch has to be activated to connect the at least one supplementary power supply to the at least one power supply line to supply power to the at least one consumer unit. Therefore, a risk of an unintended connection of the at least one main power supply and/or the at least one supplementary power supply to the at least one power supply line to supply power to the at least one consumer unit may be reduced. As a result, the consumer unit may be protected from any failure of the at least one main power supply and/or the at least one supplementary power supply. Furthermore, an unnecessary power consumption may be avoided.

In some embodiments, at least one of the consumer switch and the supplementary consumer switch is a normally closed switch.

Accordingly, the at least one consumer switch has to be deactivated to connect the at least one consumer unit to the at least one power supply line. Similarly, the at least one supplementary consumer unit switch has to be deactivated to connect the at least one supplementary consumer unit to the at least one power supply line. Therefore, a connection of the power supply to the consumer unit and/or supplementary consumer unit is not interrupted by the at least one consumer switch or the at least one supplementary consumer switch, respectively, as long as the at least one consumer switch and/or the at least one supplementary consumer switch is not activated. In other words, a risk of an unintended interruption by the at least one consumer switch and/or the at least one supplementary consumer switch may be reduced.

In some embodiments, at least one of the main power supply switch, the supplementary power supply switch, the consumer switch and the supplementary consumer switch is a high side switch.

For example, the at least one consumer switch is disposed between the at least one consumer unit and any of the at least one main power supply and/or the at least supplementary power supply. Similarly, the at least one supplementary consumer switch may be disposed between the at least one supplementary consumer unit and any of the at least one main power supply and/or the at least supplementary power supply. As another example, the main power supply switch may be disposed between the main power supply and the at least one consumer switch, which is disposed between the at least one consumer unit and any of the at least one main power supply and/or the at least supplementary power supply. Similarly, the at least one supplementary power supply switch may be disposed between the supplementary power supply and the at least one consumer switch, which is disposed between the at least one consumer unit and any of the at least one main power supply and/or the at least supplementary power supply. With at least one of the main power supply switch, the supplementary power supply switch, the consumer switch and the supplementary consumer switch being a high side switch, any effect by a failure in advance of the consumer unit may be prohibited from reaching the at least one consumer unit via the power supply line. In particular, the at least one consumer switch as a high side switch may separate the at least one consumer unit from any upstream component with respect to the direction of power supply along the power supply line at once. For example, the high side switch is connecting to the voltage supply of the power supply line. Accordingly, the ground of the different components associated with the high side switch are connected together at all times and they are on the same electrical potential.

In some embodiments, at least one of the main power supply switch, the supplementary power supply switch, the consumer switch and the supplementary consumer switch is a low side switch.

Similarly to the consumer switch, any low side switch may allow to disconnect a power supply by and for all components at once. However, the influence before the disconnection may run over the at least one consumer unit. For example, the low side switch is connecting to the ground of the power supply line. Accordingly, a lower voltage level than the input voltage level is sufficient to control the low side switch.

In some embodiments, the power supply management system is configured to switch at least one of the main power supply switch, the supplementary power supply switch, the consumer switch and the supplementary consumer switch in a disconnected state based on a reverse polarity, an over voltage, an under voltage, an over current and/or a temperature exceeding or falling below a predetermined threshold.

Accordingly, any subsequent component downstream of the at least one of the main power supply switch, the supplementary power supply switch, the consumer switch and the supplementary consumer switch with respect to the direction of power supply may be protected against any negative effect or damage due to a reverse polarity, an over voltage, an under voltage, an over current and/or a temperature exceeding or falling below a predetermined threshold. To detect a reverse polarity, an over voltage, an under voltage, an over current and/or a temperature exceeding or falling below a predetermined threshold and to switch at least one of the at least one main power supply switch, the at least one supplementary power supply switch, the at least one consumer switch and the at least one supplementary consumer switch in a disconnected state accordingly, the power supply management system may comprise a monitoring and control unit.

Preferably, at least one of the main power supply switch, the supplementary power supply switch, the consumer switch and the supplementary consumer switch is configured to detect a reverse polarity, an over voltage, an under voltage, an over current and/or a temperature exceeding or falling below a predetermined threshold and to switch into a disconnected state based on such detection.

A switch capable of detecting such failure may be assumed as smart switch. Such smart switch may transmit a respective failure signal to a control unit configured to switch the smart switch accordingly. Alternatively or in addition, the smart switch is capable of processing respective signals within a smart switch processor unit to switch itself. A smart switch as self-switching switch may provide faster reaction times. An additional control unit may function as a redundant security level as the smart switch may fail. Further, the control unit separate from the smart switch may also allow the respective switch being switched due to other events not detectable by the switch itself, like a failure of a downstream component.

In some embodiments, at least one of the main power supply switch, the supplementary power supply switch, the consumer switch and the supplementary consumer switch is configured to detect a functional state of the at least one consumer unit, the at least one main power supply and/or the at least one supplementary power supply.

The at least one main power supply switch, the at least one supplementary power supply switch, the at least one consumer switch and/or the at least one supplementary consumer switch may therefore be configured to receive functional state information of the at least one consumer unit, the at least one main power supply and/or the at least one supplementary power supply. The functional state information may be processed by the at least one supplementary power supply switch, the at least one consumer switch and/or the at least one supplementary consumer switch and/or transmitted to a control unit. As a consequence of a detected functional state deviating from a predetermined functional state, the at least one main power supply switch, the at least one supplementary power supply switch, the at least one consumer switch and/or the at least one supplementary consumer switch may switch itself or may be switched by the control unit in a disconnected state. Alternatively or in addition, the at least one main power supply switch, the at least one supplementary power supply switch, the at least one consumer switch and/or the at least one supplementary consumer switch and/or the control unit may deactivate the at least one consumer unit, the at least one main power supply and/or the at least one supplementary power supply associated with a respective failure or affected by a result of such failure. Thereby damages of affected components and/or an unnecessary power consumption may be avoided.

A respective detection may be performed continuously, periodically or based on predetermined events. A predetermined event may be an initiation of a detection procedure, e.g. by an operator's input or a particular program routine, a start of the vehicle and/or a change of an operating mode of the vehicle. The predetermined events may be adaptable in dependence of an operating mode of the vehicle, e.g. when changing in an autonomous driving mode.

Preferably, the detection of the functional state comprises at least a detection of the functional state of safety-critical components or functions.

Safety critical components or functions are mandatory for operating a vehicle. If any of the critical components or functions is not in a predetermined functional state a safety critical failure is assumed and operation of the vehicle has to be stopped. A safety-critical component may be the at least one consumer unit and/or a functional group associated with the at least one consumer unit, such as a braking device controlled a braking unit as consumer unit.

In some embodiments, at least one of the main power supply switch, the supplementary power supply switch, the consumer switch and the supplementary consumer switch is configured to provide a self-fault diagnosis.

Accordingly, the at least one main power supply switch, the at least one supplementary power supply switch, the at least one consumer switch and/or the at least one supplementary consumer switch may not only be configured to detect the functional state of other components or at least a subsequent effect of a failure of such components. Alternatively or in addition, the at least one main power supply switch, the at least one supplementary power supply switch, the at least one consumer switch and/or the at least one supplementary consumer switch comprises a self-fault-diagnosis capability to provide an information of the functional state as such independent of any functional state of any component of the overall power supply management system. Such switch may deactivate itself in the event of a detected failure and/or transmits such information to a control unit to deactivate the respective switch accordingly. Consequences of a deactivation may be dependent on the respective switch being a normally open or normally closed switch. In the event of a normally open switch, the function associated with a respective connection by the respective switch may be no longer available due to deactivation of the switch. Therefore, the control unit may provide a warning signal and/or may cause the vehicle to stop. In the event of a normally closed switch, the function associated with a respective connection by the respective switch may no longer be disconnected due to deactivation of the switch but only deactivated by controlling the respective component.

In some embodiments, the at least one consumer unit comprises at least two consumers, each of which is connected or connectable by a respective consumer switch to a respective power supply line associated with a different main power supply and/or a different supplementary power supply.

As the at least one main power supply and/or the at least one supplementary power supply may fail, at least one of the at least two consumers may still be operable as being independent of the at least one main power supply and/or the at least one supplementary power supply. In one example, each of the at least two consumers is associated with at least one different supplementary power supply. A complete failure of all functions provided by the at least two consumers due to a failure of one supplementary power supply may therefore be avoided. Even though the at least two consumers may be connectable and disconnectable to different supplementary power supplies, the at least two consumers may be connectable and disconnectable to the same main power supply.

Preferably, at least one of the at least two consumers of the at least one consumer unit comprises at least partially redundant functions with respect to at least another one of the at least two consumers of the at least one consumer unit.

Accordingly, the one consumer unit is at least partially redundant to the other consumer unit.

Preferably, the at least one of the at least two consumers of the at least one consumer unit comprises at least redundant safety-critical functions with respect to the at least one other of the at least two consumers of the at least one consumer unit.

Therefore, at least safety-critical functions may still be performed by the one consumer in the event of a failure of the other consumer or the at least main power supply and/or the at least one supplementary power supply associated with the other consumer.

In some embodiments, the at least one power supply line comprises at least one fuse.

In the event of a failure of the at least one main power supply switch, the at least one supplementary power supply switch, the at least one consumer switch and/or the at least one supplementary consumer switch, the at least one fuse can still provide a redundant safety level. The at least one fuse may be arranged in association with a respective one of the at least one main power supply switch, the at least one supplementary power supply switch, the at least one consumer switch and/or the at least one supplementary consumer switch to provide the additional safety level for the respectively, associated switch. Accordingly the threshold for blowing the at least one fuse may be set to a value above an upper disconnecting threshold of the respective switch to allow the switch to disconnect first before unnecessarily blowing the fuse. In other words, the threshold for blowing is configured in such way that in case of a failure the respective switch would disconnect prior to the fuse. But if the switch has a failure and does not disconnect in this case, the disconnection will then be realized by the fuse. The power supply management system may comprise such fuse for any or at least one of at least one main power supply switch, the at least one supplementary power supply switch, the at least one consumer switch and/or the at least one supplementary consumer switch Further advantages, aspects and details of the invention are subject to the claims, the following description of preferred embodiments applying the principles of the invention, and drawings.

DETAILED DESCRIPTION OF THE DRAWINGS

Figure 1:
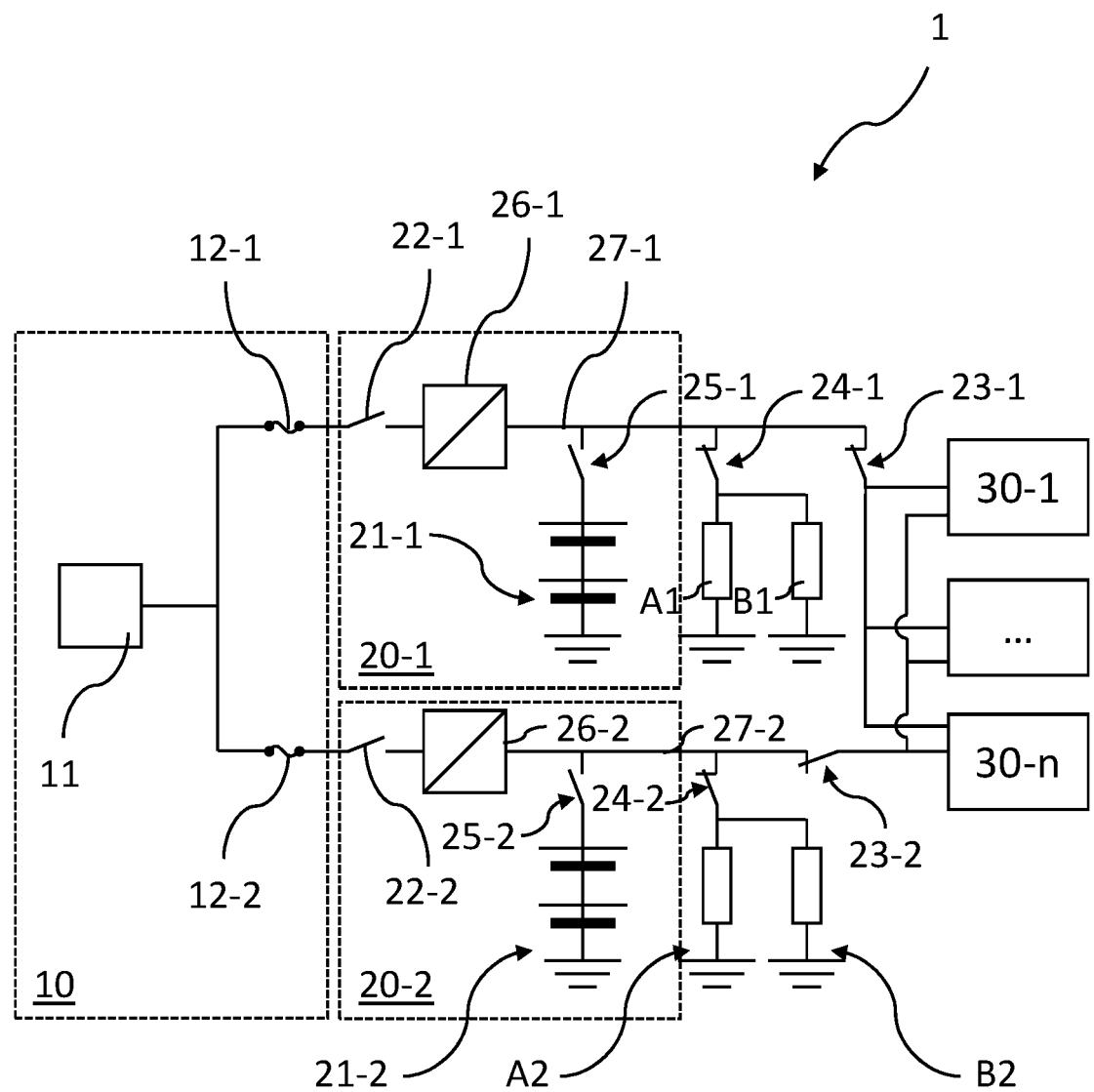
FIG. 1 is a schematic diagram of a power supply management system according to an exemplary embodiment of the present invention.

FIG. 1 is a schematic diagram of a power supply management system 1 according to an exemplary embodiment of the present invention. The power supply management system 1 comprises a main power supply unit 10 with a main power supply 11 to supply power to consumer units 30-1, . . . , 30-n via two power supply lines 27-1, 27-2, each of which is connectable to each of the consumer units 30-1, . . . , 30-n via two main power switches 22-1, 22-2, each of which is associated with one of the power supply lines 27-1, 27-2.

The power supply management system 1 further comprises two supplementary power supply units 20-1, 20-2, each of which comprising a supplementary power supply 21-1, 21-2. Each of the supplementary power supplies is connectable to one of the power supply lines 27-1, 27-2 via a respective supplementary power supply switch 25-1, 25-2. Further, each of the power supply lines 27-1, 27-2 comprises a converter 26-1, 26-2 disposed between the respective main power supply switch 22-1, 22-2 and the respective branch to the respective supplementary power supply switch 25-1, 25-2. The converters 26-1, 26-2 convert the current supplied by the main power supply 11 into a current to be received by the consumer units 30-1, . . . , 30-n, e.g. from AC to DC or vice versa or to different voltage levels. In alternative embodiments the converters 26-1, 26-2 may be arranged downstream of the respective main power supply switch 22-1, 22-2 and supplementary power supply switch 25-1, 25-2 in the direction of the power supply to the consumer units 30-1, . . . , 30-n to convert both, the current by the main power supply 11 and by the respective supplementary power supply 21-1, 21-2. Next to the consumer units 30-1, . . . , 30-n further supplementary consumer units A1, B1 are connectable and disconnectable to the power supply line 27-1 by a supplementary consumer switch 24-1 and supplementary consumer units A2, B2 are connectable and disconnectable to the other power supply line 27-2 by a supplementary consumer switch 24-2. The consumer units 30-1, . . . , 30-n are prioritized relative to the supplementary consumer units A1, B1, A2, B2. That is, the supplementary consumer units A1, B1, A2, B2 are only connected to the respective power supply lines 27-1, 27-2 as long as the main power supply 11 and/or the respective supplementary power supplies 21-1, 21-2 supply a sufficient amount of power to the consumer units 30-1, . . . , 30-n in dependence of a predicted power consumption. Otherwise, at least one of the supplementary consumer switches 24-1, 24-2 disconnects the respective supplementary consumer units A1, B1, A2, B2 from the respective power supply line 27-1, 27-2.

The main power supply system 10 further comprises a fuse 12-1, 12-2 in each of the power supply lines 27-1, 27-2 disposed between the main power supply 11 and the respective main power supply switch 22-1, 22-2 in each of the power supply lines 27-1, 27-2. The fuse is intended to disconnect the main power supply 11 from any component downstream of the respective fuse 12-1, 12-2 in the event of an over voltage or over current in the event of a failure of the respective main power supply switch 22-1, 22-2. Consequently, the fuses 12-1, 12-2 are configured to blow at a current or voltage threshold higher than an upper threshold of the respective main power supply switch 22-1, 22-2. As a result, the fuses 12-1, 12-2 only blow, if the respective main power supply switch 22-1, 22-2 does not function properly.

According to the exemplary embodiment, the main power supply switches 22-1, 22-2 and the supplementary power supply switches 25-1, 25-2 are configured as normally open switches. The consumer switches 23-1, 23-2 and the supplementary consumer switches 24-1, 24-2 are configured as normally closed switches. In alternative embodiments, the supplementary power supply switches 25-1, 25-2 or at least one of the supplementary power supply switches 25-1, 25-2 may also be configured as normally closed switches. All of the switches 22-1, 22-2, 23-1, 23-2, 24-1, 24-1, 25-1, 25-2 are arranged as high-side switches. Each of the switches 22-1, 22-2, 23-1, 23-2, 24-1, 24-1, 25-1, 25-2 is a so-called smart switch configured to detect a reverse polarity, an over voltage, an under voltage, an over current and/or a temperature exceeding or falling below a predetermined threshold associated with a failure and/or a risk of damaging other components and to open to interrupt the respective power supply line 27-1, 27-2. For example, the switches 22-1, 22-2, 23-1, 23-2, 24-1, 24-1, 25-1, 25-2 can detect a reverse polarity and are configured to decide whether a switching is required based one predetermined thresholds.

Next, a description is given to the operation of the power supply management system 1 according to the present embodiment. During a normal driving operation of a vehicle comprising the power supply management system 1, the main power supply switches 22-1, 22-2, the consumer switches 23-1, 23-2 and the supplementary consumer switches 24-1, 24-2 are closed to supply the consumer units 30-1, ..., 30n and the supplementary consumer units A1, B1, A2, B2 with power from the main power supply 11. The supplementary power supply switches 25-1, 25-2 are opened. In alternative embodiments, at least one of the supplementary power supply switches 25-1, 25-2 may be closed during normal operation to allow a power supply in the event of an increased power supply demand by at least one of the consumer units 30-1, ..., 30n. Accordingly, at least one supplementary power supply 21-1, 21-2 associated with a respective supplementary power supply switch 25-1, 25-2 may work as a buffer. The at least one supplementary power supply 21-1, 21-2 may also be charged by the main power supply 11 in such configuration. If in the present embodiment, for example, an over current is detected by one of the main power supply switches 22-1, 22-2, the respective main power supply switch 22-1, 22-2 opens to disconnect the main power supply 11 from the respective power supply line 27-1, 27-2. To allow further power supply to the consumer units 30-1, ..., 30n, the respective supplementary power supply switches 25-1, 25-2 are closed. In the alternative embodiment with at least one of the supplementary power supply switches 25-1, 25-2 being a normally closed switch, the supplementary power supply switch 25-1, 25-2 may remain closed. As the maximum power that can be provided by the respective supplementary power supplies 21-1, 21-2 may be limited and therefore only sufficient to cover the power consumption of the consumer units 30-1, ..., 30n, the respective supplementary consumer switches 24-1, 24-2 may be opened to disconnect the respective supplementary consumer units A1, B1, A2, B2 from the respective power supply line 27-1, 27-2. If the respective consumer switches 23-1, 23-2 detect a further failure downstream of the respective supplementary power supply switches 25-1, 25-2, the respective consumer switch 23-1, 23-2 opens to disconnect the consumer units 30-1, ..., 30n from a respective power supply line 27-1, 27-2 to protect the respective consumer unit 30-1, ..., 30-n against any potential damage by such failure.

Figure 2:
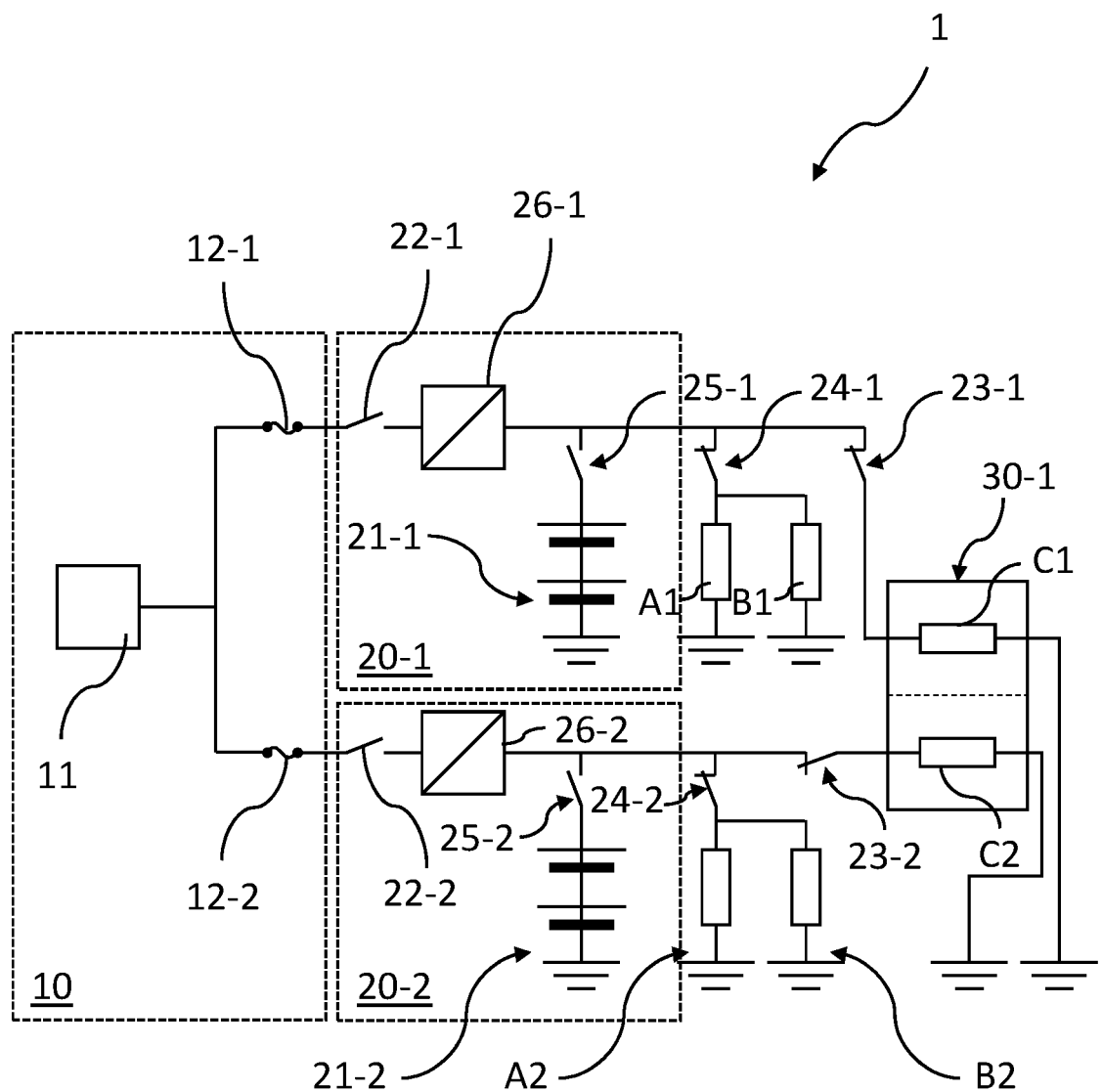
FIG. 2 is a schematic diagram of the power supply management system according to FIG. 1 depicting further details with respect to a consumer unit of the power supply management system.

FIG. 2 is a schematic diagram of the power supply management system 1 according to FIG. 1 depicting further details with respect to a consumer units 30-1, ..., 30-n of the power supply management system 1. To simplify the representation, FIG. 2 only shows consumer unit 30-1. The consumer unit 30-1 comprises two consumers C1, C2. Here, the range of functions of the two consumers C1, C2 is identical. Accordingly, consumer 1 is redundant to consumer 2 and vice versa. Each of the consumers C1, C2 is connectable to one of the power supply lines 27-1, 27-2. As one supply line 27-1, 27-2 and/or one of the consumers C1, C2 may fail, the power supply management system 1 may still provide the same functionalities by the other consumer C1, C2.

The invention has been described in with respect to an exemplary embodiment. However, the invention is not limited to the exemplary embodiment. In particular, instead of a smart switch for the switches or the fuse described above, a smart fuse may be used that provides similar control options with respect to a failure detection but only with a one-time switching capability. Further, the smart switches may provide a pre-charge and/or discharge capability. As a resistance when a smart switch is turned on may be very small, a small voltage difference between the two sides of such smart switch may result in a high current spike during the transition. Therefore, a pre-charge capability may be implemented to eliminate or at least reduce the voltage difference before the smart switch is turned on. Further, when the smart switch is turned off, the respective current path is interrupted and energy stored, e.g. in capacitors, downstream of the smart switch may only be slowly dissipated. To accelerate the dissipation, a discharge capability may be implemented in the smart switch. As another example, the smart switch may comprise an electrical circuit as a charge pump to supply a higher voltage level for the smart switch to be turned on. The smart switches may further be configured to provide self-testing capabilities. For example, such smart switch may comprise an electrical circuit to test whether the current sensing of the smart switch is working properly before the smart switch is turned on.

LIST OF REFERENCE SIGNS 1 power supply management system
10 main power supply unit
11 main power supply
12-1, 12-2 fuse
20-1, 20-2 supplementary power supply unit
21-1, 21-2 supplementary power supply
22-1, 22-2 main power supply switch
23-1, 23-2 consumer switch
24-1, 24-2 supplementary consumer switch
25-1, 25-2 supplementary power supply switch
26-1, 26-2 converter
27-1, 27-2 power supply line
30-1, ..., 30-n consumer unit
A1, A2, B1, B2 supplementary consumer unit
C1, C2 (redundant) consumer

The invention claimed is:

1. A power supply management system for a vehicle comprising:
   at least one main power supply unit comprising at least one main power supply;
   at least one supplementary power supply unit comprising at least one supplementary power supply;
   at least one consumer unit comprising at least two consumers, each of which is connected or connectable by a respective consumer switch to a respective power supply line associated with a different main power supply and/or a different supplementary power supply;
   a main power supply switch and a supplementary power supply switch; and
   at least one power supply line connectable to the at least one consumer unit to supply power from at least one of the at least one main power supply and the at least one supplementary power supply to the at least one consumer unit,
   wherein the main power supply and the at least one supplementary power supply are connectable to and disconnectable from the at least one supply line on demand by the main power supply switch and the supplementary power supply switch, respectively, to allow or impede the supply of power from at least one of the at least one main power supply and/or the at least one supplementary power supply to the at least one consumer unit.

2. The power supply management system according to claim 1, wherein
the at least one power supply line comprises at least one consumer switch configured to connect and disconnect the at least consumer unit from any power supply of the at least one main power supply and/or the at least one supplementary power supply.

3. The power supply management system according to claim 1, further comprising:
at least one supplementary consumer unit connectable to the at least one power supply line by a supplementary consumer switch configured to connect and disconnect the at least one supplementary consumer unit to or from the at least one power supply line.

4. The power supply management system according to claim 1, wherein
at least one of: the main power supply switch or the supplementary power supply switch is a normally open switch.

5. The power supply management system according to claim 3, wherein
at least one of: the consumer switch or the supplementary consumer switch is a normally closed switch.

6. The power supply management system according to claim 3, wherein
at least one of: the main power supply switch, the supplementary power supply switch, the consumer switch, or the supplementary consumer switch is a high side switch.

7. The power supply management system according to claim 3, wherein
at least one of: the main power supply switch, the supplementary power supply switch, the consumer switch, or the supplementary consumer switch is a low side switch.

8. The power supply management system according to claim 3, wherein
the power supply management system is configured to switch at least one of: the main power supply switch, the supplementary power supply switch, the consumer switch, or the supplementary consumer switch in a disconnected state based on a reverse polarity, an over voltage, an under voltage, an over current and/or a temperature exceeding or falling below a predetermined threshold.

9. The power supply management system according to claim 8, wherein
at least one of: the main power supply switch, the supplementary power supply switch, the consumer switch, or the supplementary consumer switch is configured to detect a reverse polarity, an over voltage, an under voltage, an over current and/or a temperature exceeding or falling below a predetermined threshold and to switch into a disconnected state based on such detection.

10. The power supply management system according to claim 3, wherein
at least one of: the main power supply switch, the supplementary power supply switch, the consumer switch, or the supplementary consumer switch is configured to detect a functional state of the at least one consumer unit, the at least one main power supply, and/or the at least one supplementary power supply.

11. The power supply management system according to claim 10, wherein
the detection of the functional state comprises at least a detection of the functional state of safety-critical components or functions.

12. The power supply management system according to claim 3, wherein
at least one of: the main power supply switch, the supplementary power supply switch, the consumer switch, or the supplementary consumer switch is configured to provide a self-fault diagnosis.

13. The power supply management system according to claim 1, wherein
at least one of the at least two consumers of the at least one consumer unit comprises at least partially redundant functions with respect to the at least one other of the at least two consumers of the at least one consumer unit.

14. The power supply management system according to claim 13, wherein
the at least one of the at least two consumers of the at least one consumer unit comprises at least redundant safety-critical functions with respect to the at least one other of the at least two consumers of the at least one consumer unit.

15. The power supply management system according to claim 1, wherein
the at least one power supply line comprises at least one fuse.

* * * * *